United States Patent
Seo et al.

(10) Patent No.: US 9,474,059 B2
(45) Date of Patent: Oct. 18, 2016

(54) METHOD FOR RECEIVING DOWNLINK CONTROL SIGNAL, USER EQUIPMENT, METHOD FOR TRANSMITTING DOWNLINK CONTROL SIGNAL AND BASE STATION

(71) Applicant: LG ELECTRONICS INC., Seoul (KR)

(72) Inventors: Daewon Seo, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 14/371,974

(22) PCT Filed: Jan. 14, 2013

(86) PCT No.: PCT/KR2013/000278
§ 371 (c)(1),
(2) Date: Jul. 11, 2014

(87) PCT Pub. No.: WO2013/105832
PCT Pub. Date: Jul. 18, 2013

(65) Prior Publication Data
US 2015/0063231 A1    Mar. 5, 2015

Related U.S. Application Data

(60) Provisional application No. 61/586,162, filed on Jan. 13, 2012.

(51) Int. Cl.
*H04W 72/04* (2009.01)
*H04L 1/00* (2006.01)
*H04L 1/18* (2006.01)
*H04L 5/00* (2006.01)
*H04L 5/14* (2006.01)

(52) U.S. Cl.
CPC .......... *H04W 72/042* (2013.01); *H04L 1/0031* (2013.01); *H04L 5/0044* (2013.01); *H04L 5/0048* (2013.01); *H04L 5/0053* (2013.01); *H04L 1/1896* (2013.01); *H04L 5/0016* (2013.01); *H04L 5/0023* (2013.01); *H04L 5/1469* (2013.01)

(58) Field of Classification Search
CPC .................................................... H04W 72/042
See application file for complete search history.

(56) References Cited

U.S. PATENT DOCUMENTS

| 7,693,111 | B2 | 4/2010 | Sondur et al. |
| 2007/0115890 | A1 | 5/2007 | Yi et al. |
| 2010/0296479 | A1 | 11/2010 | Cho et al. |
| 2011/0310818 | A1 | 12/2011 | Lin et al. |
| 2013/0155969 | A1 | 6/2013 | Moon et al. |

FOREIGN PATENT DOCUMENTS

| KR | 10-2011-0102145 A | 9/2011 |
| KR | 10-2011-0112789 A | 10/2011 |
| WO | WO 2011/153507 A2 | 12/2011 |

*Primary Examiner* — Dong Ton
*Assistant Examiner* — Kevin Lee
(74) *Attorney, Agent, or Firm* — Birch, Stewart, Kolasch & Birch, LLP

(57) ABSTRACT

In the event where a channel strength between UE and eNB is weakened, the eNB of the present invention may configure downlink control information into the format in which at least one of fields of pre-defined existing format is deleted, the length of a relevant field is shortened to be shorter than a pre-defined length of the relevant field, or an error correcting code is added by the amount of the length deleted or reduced. UE decodes a downlink signal according to the modified format to acquire downlink control information of its own.

12 Claims, 18 Drawing Sheets

FIG. 10

FIG. 16 frequency →

| RB 1 | RB 2 | RB 3 | RB 4 | RB 5 | RB 6 | RB 7 | RB 8 | RB 9 | RB 10 | Group 1 |
| RB 11 | RB 12 | RB 13 | RB 14 | RB 15 | RB 16 | RB 17 | RB 18 | RB 19 | RB 20 | Group 2 |
| RB 21 | RB 22 | RB 23 | RB 24 | RB 25 | RB 26 | RB 27 | RB 28 | RB 29 | RB 30 | Group 3 |
| RB 31 | RB 32 | RB 33 | RB 34 | RB 35 | RB 36 | RB 37 | RB 38 | RB 39 | RB 40 | Group 4 |

METHOD FOR RECEIVING DOWNLINK CONTROL SIGNAL, USER EQUIPMENT, METHOD FOR TRANSMITTING DOWNLINK CONTROL SIGNAL AND BASE STATION

CROSS REFERENCE TO RELATED APPLICATIONS

This application is the National Phase of PCT International Application No. PCT/KR2013/000278, filed on Jan. 14, 2013, which claims priority under 35 U.S.C. 119(e) to U.S. Provisional Application No. 61/586,162, filed on Jan. 13, 2012, all of which are hereby expressly incorporated by reference into the present application.

TECHNICAL FIELD

The present invention relates to a wireless communication system. Specifically, the present invention relates to a method and apparatus for transmitting/receiving an uplink control signal.

BACKGROUND ART

In a wireless communication system, a transmitting device transmits a signal through a radio frequency channel. If signal quality is deteriorated due to occurrence of an obstacle to the radio channel formed between the transmitting device and a receiving device which is a destination of the signal, the signal may not successfully reach the receiving device or, even if the signal reaches the receiving device, the signal may not be correctly demodulated or decoded due to errors.

FIG. 1 is a diagram for explaining an example of low reception signal strength. Particularly, FIG. 1 illustrates an example of increasing pathloss between an evolved NodeB (eNB) and a user equipment (UE). When a UE, UE1 for example, is located at a cell edge of a geographic region served by an eNB or when an obstacle such as a building is positioned between an eNB and a UE, UE2 for example, so that a signal transmission path is blocked, a signal from the UE to the eNB or from the eNB to the UE may not correctly be transmitted.

DETAILED DESCRIPTION OF THE INVENTION

Technical Problems

The present invention provides a method and an apparatus for improving coverage of a signal transmitted by a transmitting device capable of being reached with valid strength and/or a low error rate in a wireless communication environment.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving a downlink control signal by a user equipment, the method comprising: decoding the downlink control signal according to a modified first format if receiving information indicating modification of a first format or a downlink control information format; and performing downlink data reception or uplink data transmission indicated by the decoded downlink control signal.

In another aspect of the present invention, provided herein is a user equipment for receiving a downlink control signal, the user equipment comprising: a radio frequency (RF) unit; and a processor configured to control the RF unit, wherein the processor decodes the downlink control signal according to a modified first format if receiving information indicating modification of a first format or a downlink control information format and controls the RP unit to perform downlink data reception or uplink data transmission indicated by the decoded downlink control signal.

In another aspect of the present invention, provided herein is a method for transmitting a downlink control signal by a base station, the method comprising: transmitting the downlink control signal configured according to a modified first format if receiving information indicating modification of a first format or a downlink control information forma; and performing downlink data transmission or uplink data reception indicated by the downlink control signal.

In another aspect of the present invention, provided herein is a base station for transmitting a downlink control signal, the base station comprising: a radio frequency (RF) unit; and a processor configured to control the RF unit, wherein the processor configures the downlink control signal according to a modified first format if transmitting information indicating modification of a first format or a downlink control information format and controls the RF unit to transmit the configured downlink control signal and to perform downlink data transmission or uplink data reception indicated by the transmitted downlink control signal.

In each aspect of the present invention, the first format may be configured by a plurality of fields each having a predefined length and the modified first format may include at least one field having a shorter length (hereinafter, a second length) than a corresponding predefined length (hereinafter, a first length) among the plural fields in the first format.

In each aspect of the present invention, if the information indicating modification of the downlink control information format is transmitted to the user equipment from the base station, bits corresponding to difference between the first length and the second length may be configured as a predesignated value or an error correction code.

In each aspect of the present invention, the at least one field may be a field for at least one of a carrier indicator, resource assignment, a modulation and coding scheme, a redundancy version, and a new data indicator.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, the range of a signal transmitted by a transmitting device capable of being reached with valid strength or more can be increased.

Further, according to the present invention, the reliability of a signal transmitted by a transmitting device can be improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 10 illustrates a table used for start position and length determination in Type 2 RA.

FIGS. 15, 16, and 17 are diagrams for explaining a third embodiment according to the present invention.

MODE FOR INVENTION

Figure 1:
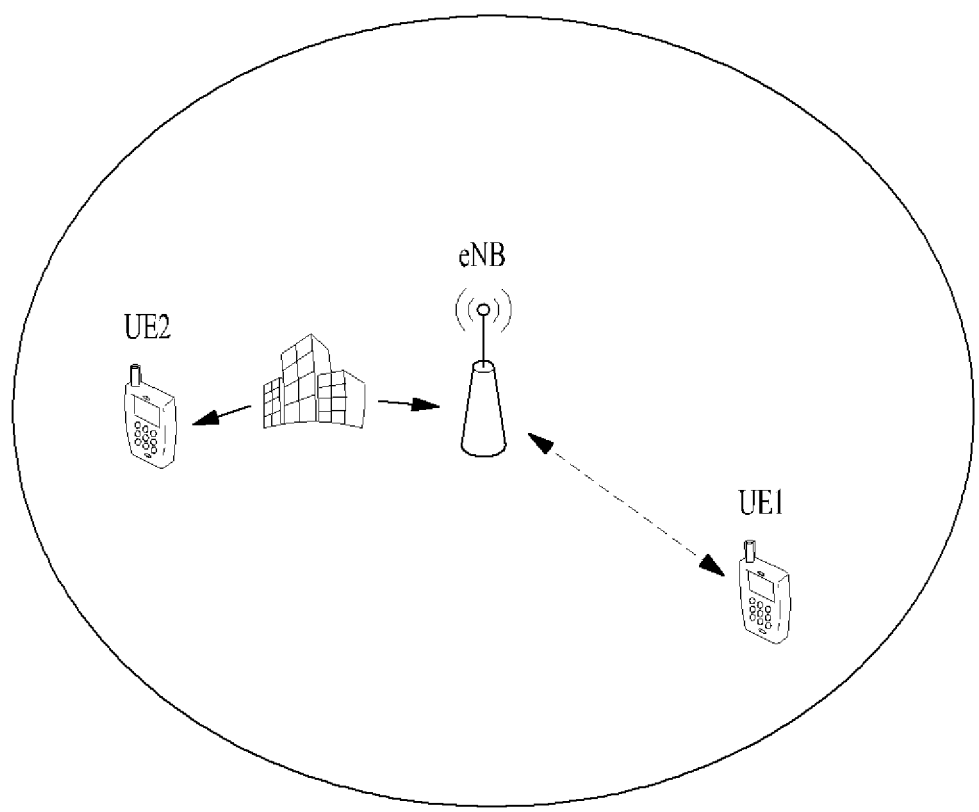
FIG. 1 is a diagram for explaining an example of low reception signal strength.

The present invention proposes that a format of an uplink/downlink signal be modified in order to improve coverage within which a signal transmitted by a transmitting device can be effectively reached. Referring to FIG. 1, the reliability of transmission data is more important than the amount of transmission data in a situation in which UE reception performance of a signal transmitted from an eNB to a UE such as UE2, or eNB reception performance of a signal transmitted from a UE such as UE1 to the eNB may be deteriorated. Accordingly, the present invention proposes raising importance of a control signal with respect to the transmission data instead of restricting data rate.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

For convenience of description, while detailed embodiments of the present invention will be described based on 3rd generation partnership project (3GPP) long term evolution (LTE) or 3GPP LTE-advanced (LTE-A), the present invention is applicable to wireless communication systems as well as an LTE system.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio link. At least one antenna is installed per node. The antenna may mean a physical antenna, an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using channel state information-reference signal(s) (CSI-RS(s)) transmitted on a CSI-RS resource allocated to the specific node by antenna port(s) of the specific node.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Figure 2:
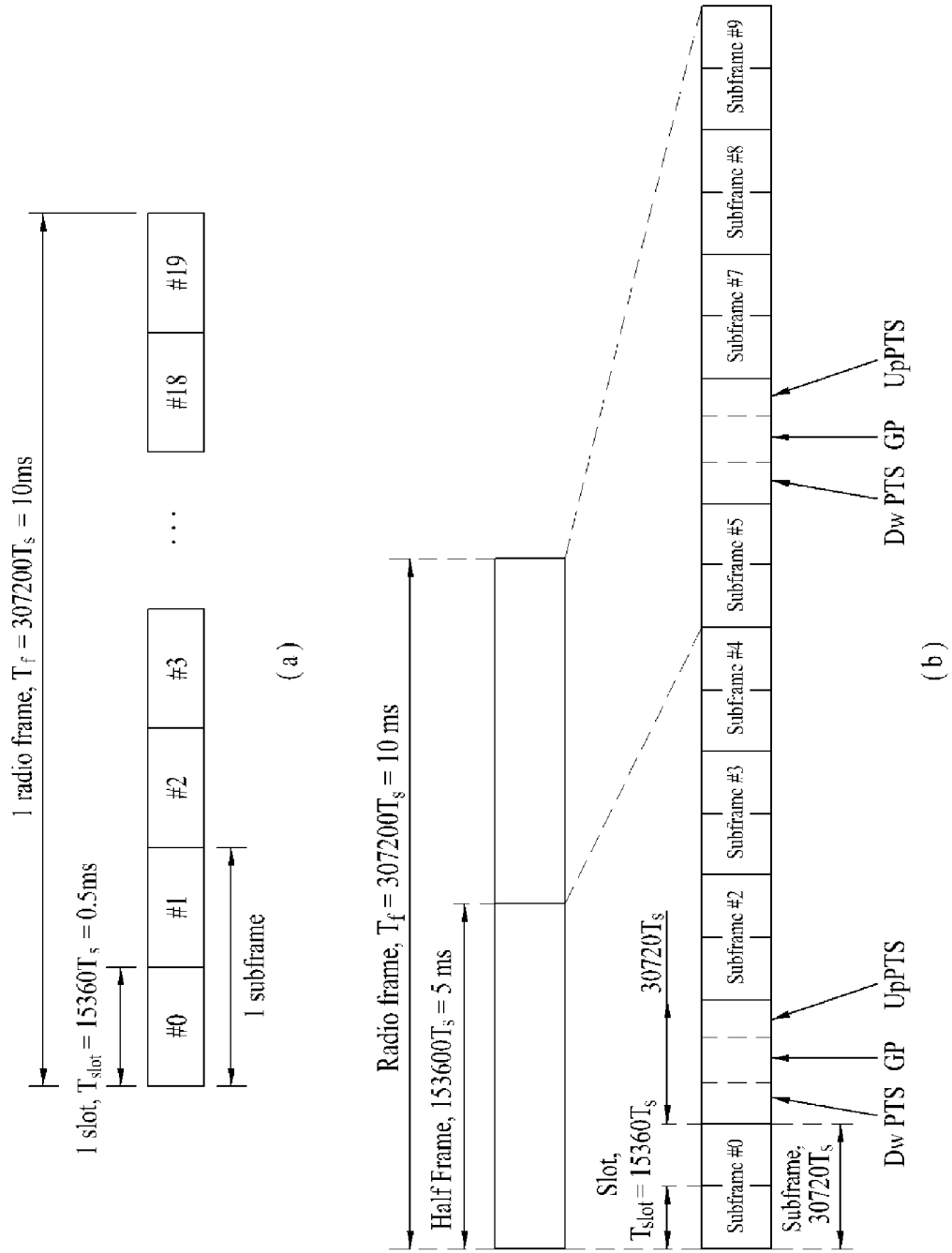
FIG. 2 illustrates the structure of a radio frame used in a wireless communication system.

FIG. 2 illustrates the structure of a radio frame used in a wireless communication system.

Specifically, FIG. 2(a) illustrates an exemplary structure of a radio frame which can be used in frequency division multiplexing (FDD) in 3GPP LTE/LTE-A and FIG. 2(b) illustrates an exemplary structure of a radio frame which can be used in time division multiplexing (TDD) in 3GPP LTE/LTE-A.

Referring to FIG. 2, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary DL-UL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
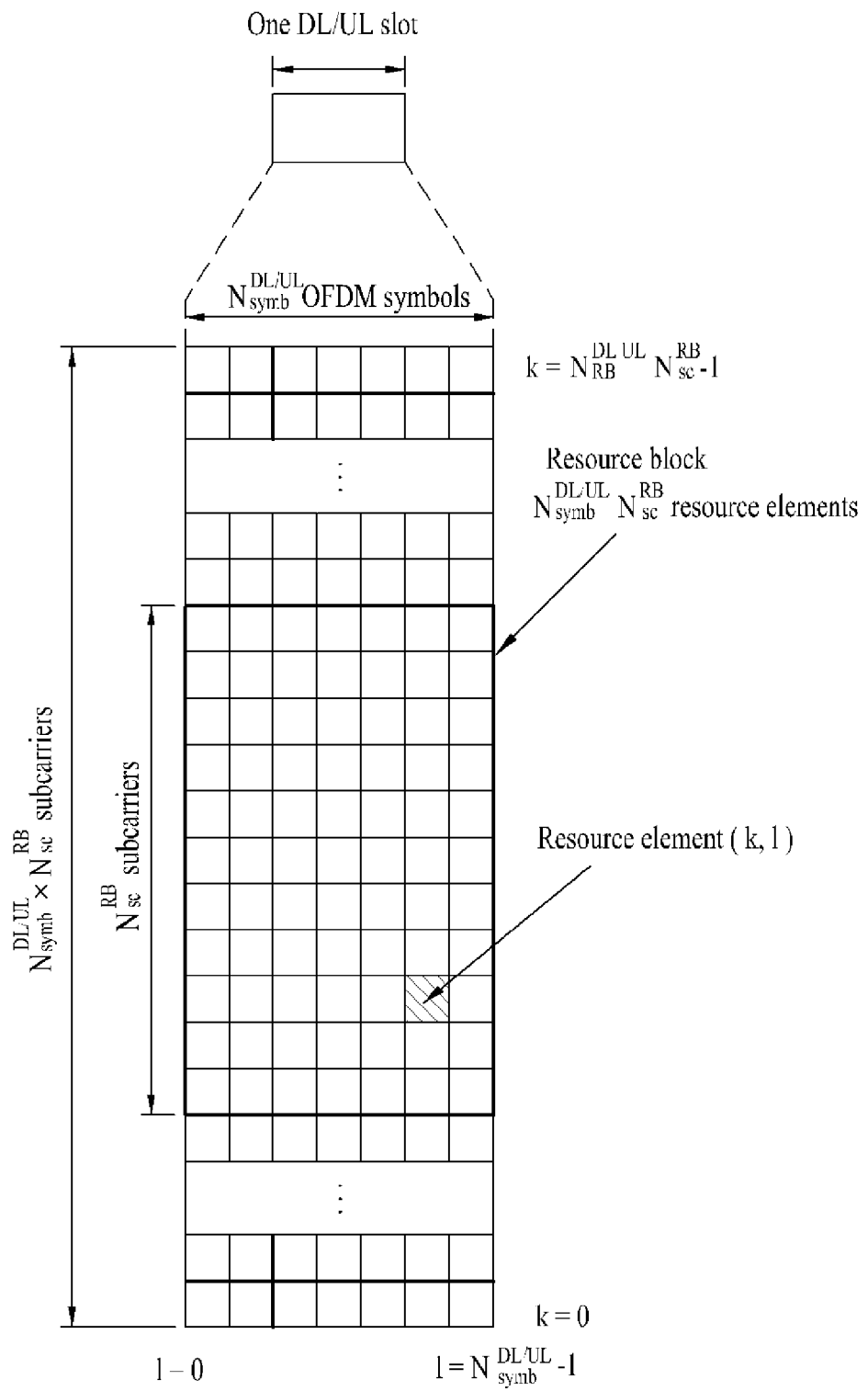
FIG. 3 illustrates the structure of a downlink (DL)/uplink (UL) slot in a wireless communication system.

FIG. 3 illustrates the structure of a DL/UL slot structure in a wireless communication system. In particular, FIG. 3 illustrates the structure of a resource grid of a 3GPP LTE/LTE-A system. One resource grid is defined per antenna port.

Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 3, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present invention are similarly applicable to subframes having a different number of OFDM symbols. Referring to FIG. 3, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k,l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). The relationship between a PRB number $n_{PRB}$ and an RE(k,l) in a slot is as follows.

$$n_{PRB} = \left\lfloor \frac{k}{N^{RB}_{sc}} \right\rfloor \quad \text{Equation 1}$$

where k denotes a subcarrier index and $N^{RB}_{sc}$ denotes the number of subcarriers included in one RB.

A VRB is a type of logical resource allocation unit introduced for resource allocation. The VRB is equal in size to the PRB. The VRB is classified into a localized VRB (LVRB) and a distributed VRB (DVRB) according to a VRB-to-PRB mapping scheme. Regardless of VRB type, a pair of RBs is allocated over two slots of a subframe by a single VRB number $n_{VRB}$. LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Two PRBs, which are respectively located at two slots of the subframe and have the same VRB number, will be referred to as VRB pair. A PRB pair and a VRB pair may be referred to as a RB pair. The RB for a UE or UE group is allocated on the basis of the VRB. Basically, VRBs having the same VRB number are allocated to the same UE or UE group.

Figure 4:
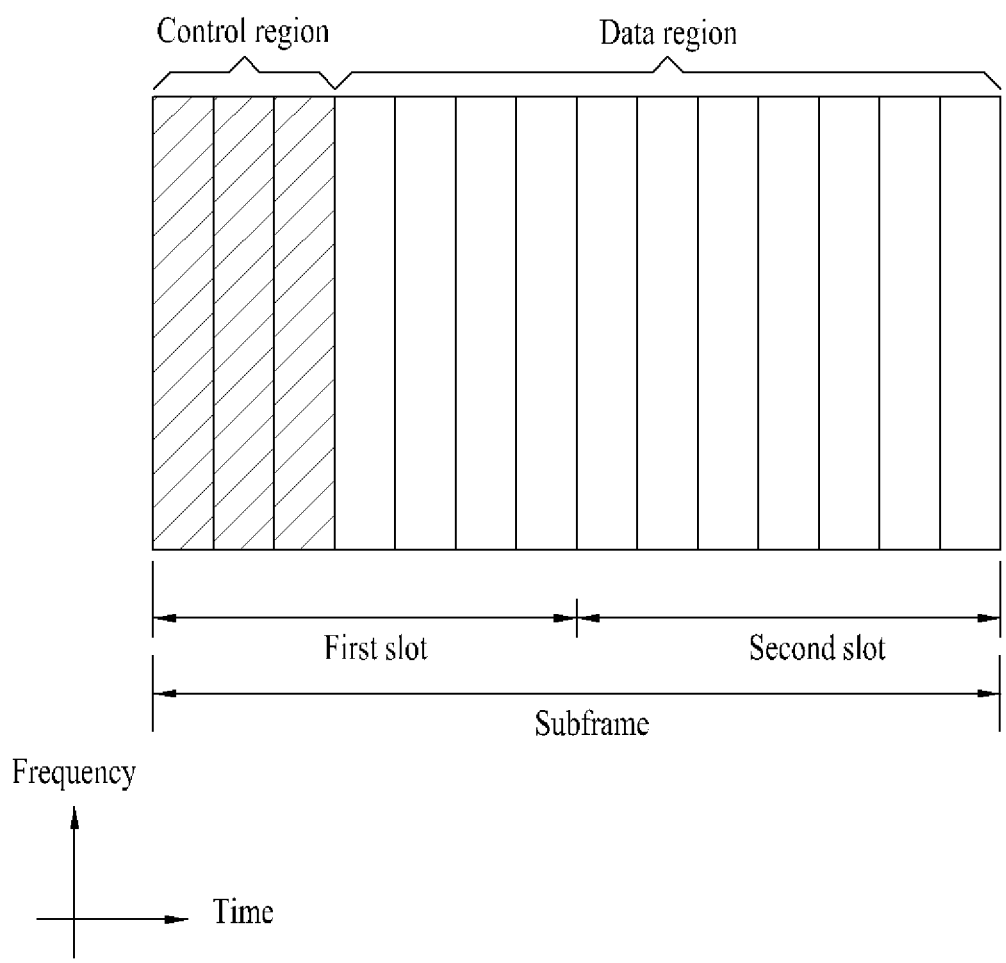
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgement) signal as a response to UL transmission.

The control information transmitted through the PDCCH is referred to as downlink control information (DCI). The DCI includes resource allocation information for a UE or UE group and other control information. A transmit format and resource allocation information of a downlink shared channel (DL-SCH) are called DL scheduling information or DL grant. A transmit format and resource allocation information of an uplink shared channel (UL-SCH) are called UL scheduling information or UL grant. The size and usage of DCI carried by one PDCCH may be varied depending on DCI formats and the size of the DCI may also be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL.

Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 3/3A | Power control commands for PUCCH and PUSCH with 2-bit,/1-bit power adjustments |
| 4 | Scheduling of PUSCH in one UL Component Carrier with multi-antenna port transmission mode |

A combination selected from control information such as a hopping flag, RB allocation, modulation and coding scheme (MCS), redundancy version (RV), new data indicator (NDI), transmit power control (TPC), cyclic shift, cyclic shift demodulation reference signal (DMRS), UL index, channel quality information (CQI) request, DL assignment index, HARQ process number, transmitted precoding matrix indicator (TPMI), and precoding matrix indicator (PMI) information is transmitted to the UE as the DCI. A detailed description of DCI format configuration will be described later with reference to FIGS. 11 and 12.

A plurality of PDCCHs may be transmitted within a control region. The UE may monitor the plurality of PDCCHs. The BS determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channel (that is, PDFICH and PHICH). The number of DCI formats and DCI bits is determined in accordance with the number of CCEs. For example, 4 DCI formats are supported as shown in Table 4.

TABLE 4

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are numbered and used consecutively. In order to simplify a decoding process, the PDCCH having a format that includes n number of CCEs may only start on a CCE fulfilling a CCE number corresponding to a multiple of n. The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. In addition, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS.

In the 3GPP LTE/LTE-A system, SSs for respective PDCCH formats may have different sizes and a dedicated SS and a common SS are defined. The dedicated SS is a UE-specific SS and is configured for each individual UE. The common SS is configured for a plurality of UEs. Table 5 shows aggregation levels for defining SSs.

TABLE 5

| | Search Space | | Number of |
| --- | --- | --- | --- |
| Type | Aggregation level | Size [in CCEs] | PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In the meantime, in order to maintain operation load based on blind decoding at a certain level or less, not all the DCI formats are searched at the same time. For example, the UE is configured semi-statically by upper layer signaling to receive PDSCH data signaled through the PDCCH in accordance with one of transmission modes 1 to 9. Table 6 illustrates a transmission mode for configuring multi-antenna technology and a DCI format where the UE performs blind decoding in accordance with the corresponding transmission mode.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE, specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 |

In particular, Table 6 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 6. For example, if the UE is configured in a transmission mode 1 by upper layer signaling, the UE acquires DCI by respectively decoding the PDCCH through the DCI format 1A and 1.

Figure 5:
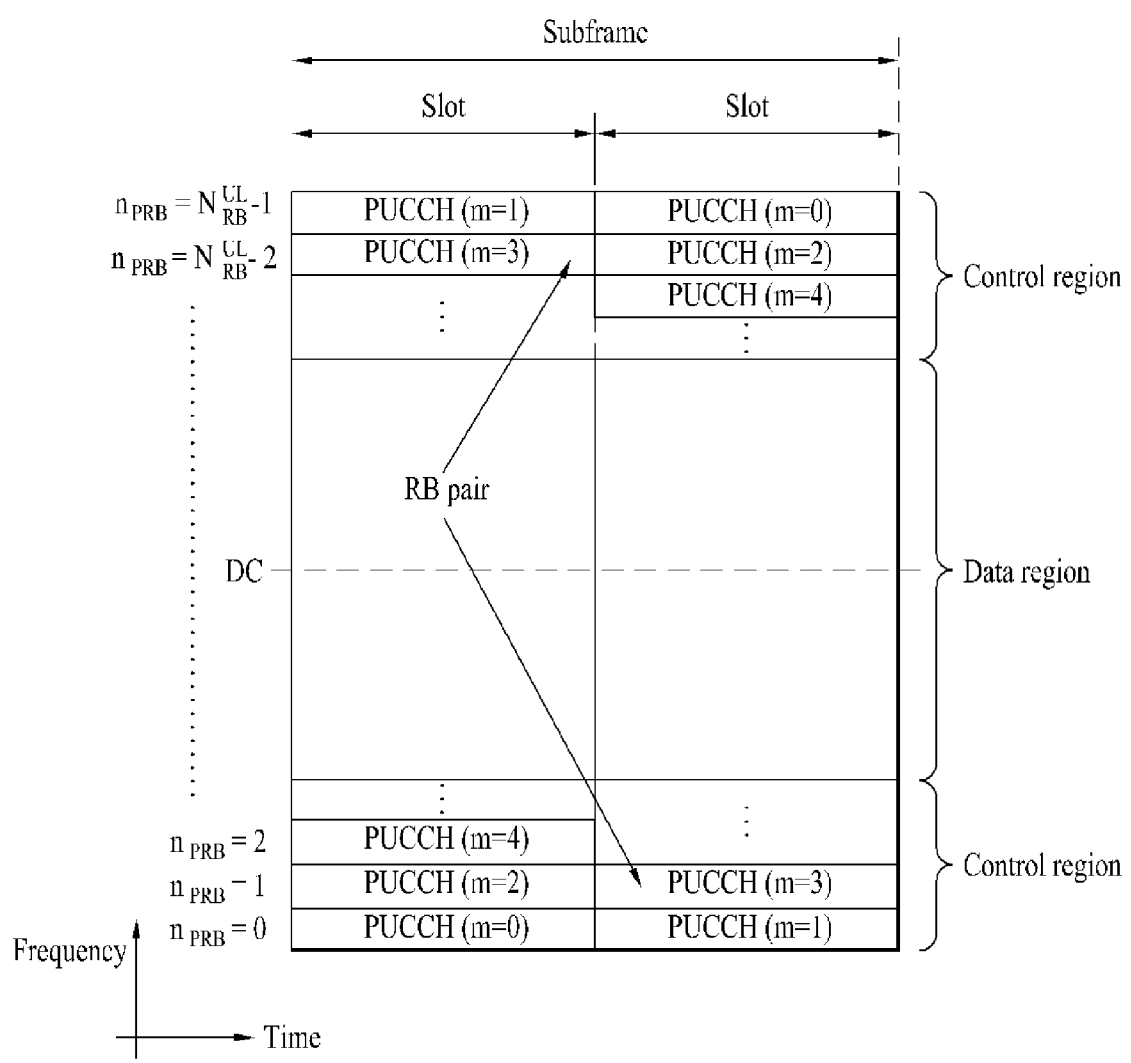
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DTX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

Figure 6:
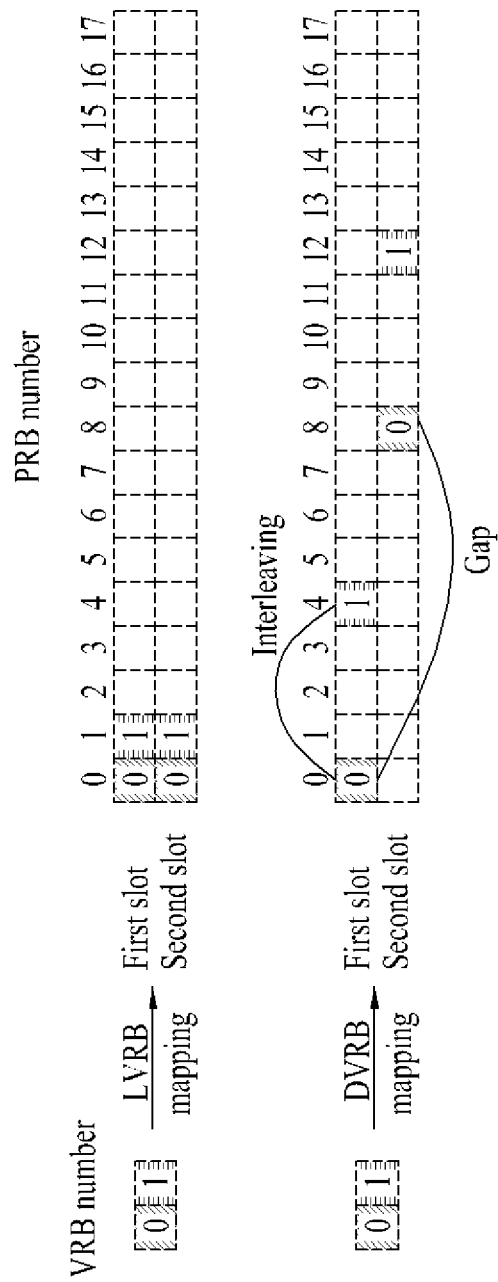
FIG. 6 illustrates a method of mapping a virtual resource block (VRB) to a physical resource block (PRB).

FIG. 6 illustrates a method of mapping a VRB to a PRB.

Referring to FIG. 6, LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Specifically, the DVRBs may be mapped to the PRBs as shown in Table 7. Table 7 illustrates RB gap values.

TABLE 7

| System BW ($N^{DL}_{RB}$) | Gap ($N_{gap}$) | |
|---|---|---|
| | 1$^{st}$ Gap ($N_{gap,1}$) | 2$^{nd}$ Gap ($N_{gap,2}$) |
| 6-10 | [$N_{RB}^{DL}/2$] | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. PRB unit) when VRBs of the same number are mapped to PRBs of the first and second slots. If $6 \leq N^{DL}_{RB} \leq 49$, only one gap is defined ($N_{gap}=N_{gap,1}$). If $50 \leq N^{DL}_{RB} \leq 110$, two gap values $N_{gap,1}$ and $N_{gap,2}$ are defined. $N_{gap}=N_{gap,1}$ or $N_{gap}=N_{gap,2}$ is signaled through DL scheduling. DVRBs are numbered from 0 to $N^{DL}_{VRB}-1$. For $N_{gap}=N_{gap,1}$, $N^{DL}_{VRB}=N^{DL}_{VRB,gap1}=2 \cdot \min$ ($N_{gap}$, $N^{DL}_{RB}-N_{gap}$). For $N_{gap}=N_{gap,2}$, $N^{DL}_{VRB}=N^{DL}_{VRB,gap2}=\text{floor}(N^{DL}_{RB}/2 \cdot N_{gap}) \cdot 2 \cdot N_{gap}$. Here, min(A, B) indicates the smaller of A and B and floor(x) indicates the largest integer not greater than x.

Consecutive $\tilde{N}^{DL}_{VRB}$ VRB numbers constitute a unit for VRB number interleaving. If $N_{gap}=N_{gap,1}$, then $\tilde{N}^{DL}_{VRB}=N^{DL}_{VRB}$ and if $N_{gap}=N_{gap,2}$, then $\tilde{N}^{DL}_{VRB}=2N_{gap}$. VRB number interleaving of each interleaving unit may be performed using four columns and $N_{row}$ rows. $N_{row}=\{\text{ceil}(\tilde{N}^{DL}_{VRB}/(4P))\} \cdot P$ and P is the size of an RBG. Here, ceil denotes a ceiling function and ceil(x) is a minimum integer not smaller than x. An RBG is defined as P consecutive RBs. VRB numbers are written in a matrix on a row-by-row basis and are read on a column-by-column basis. $N_{null}$ null values are inserted into the last $N_{null}/2$ row of the second and fourth columns and $N_{null}=N_{row}-\tilde{N}^{DL}_{VRB}$. The null values are ignored upon reading.

Meanwhile, in a 3GPP LTE/LTE-A system, various resource allocation (RA) types (e.g. Type 0 RA, Type 1 RA, Type 2 RA, etc.) are defined. For Type 0 RA or Type 1 RA, DCI formats 1, 2, and 2A are used and, for Type 2 RA, DCI formats 1A, 1B, 1C, and 1D are used. In Type 0 RA, RB allocation information includes a bitmap indicating a resource block group (RBG) allocated to a UE. The RBG is a set of one or more continuous PRBs. The size of the RBG depends upon system bandwidth. In Type 1 RA, RB allocation information indicates resources in an RBG subset allocated to a scheduled UE in units of PRBs. In Type 2 RA, RB allocation information indicates a set of VRBs continuously allocated to the scheduled UE.

Figure 7:
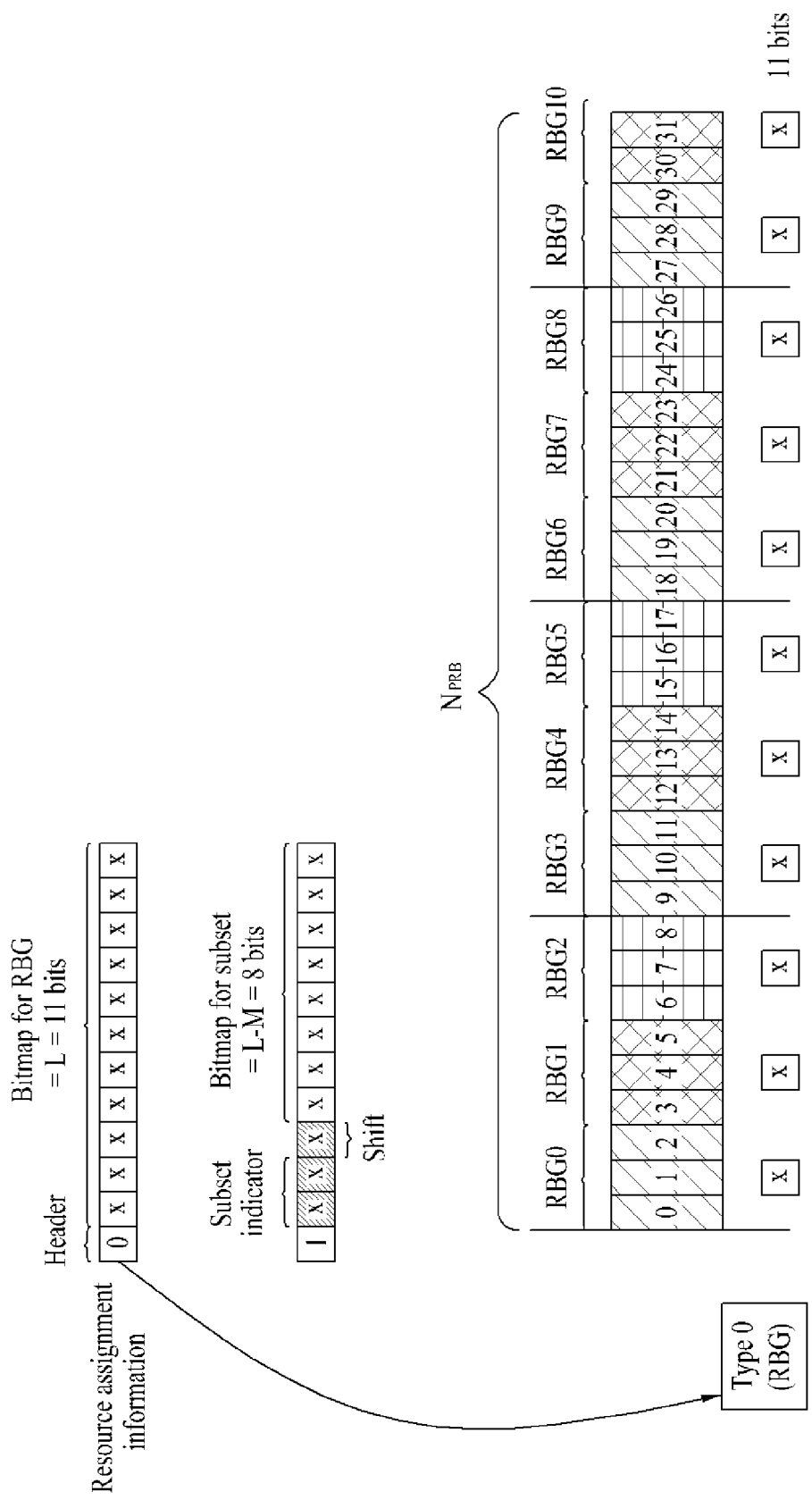
FIG. 7 illustrates control information formats for Type 0 resource allocation (RA) and an example of resource allocation thereof.
Figure 8:
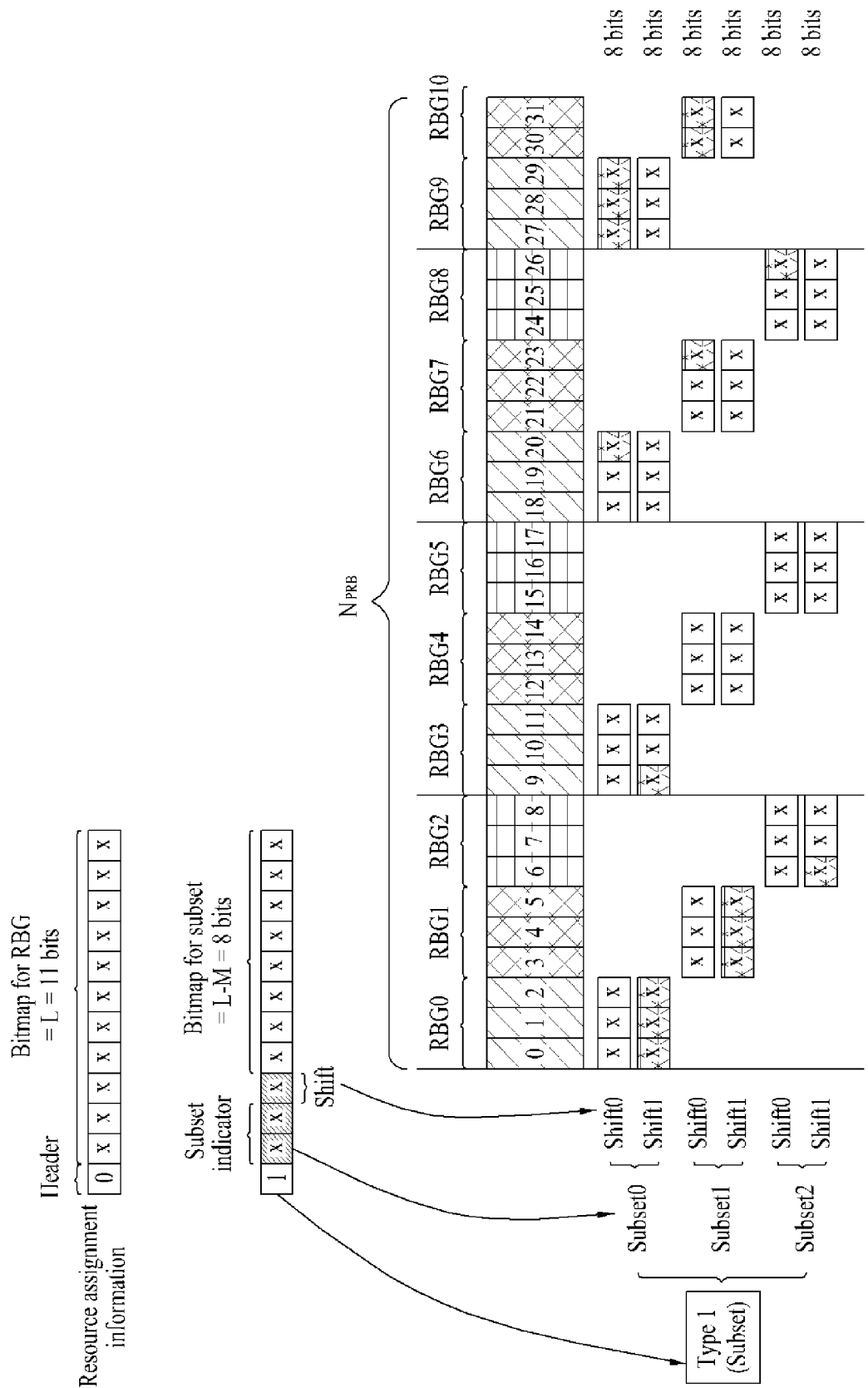
FIG. 8 illustrates control information formats for Type 1 RA and an example of resource allocation thereof.
Figure 9:
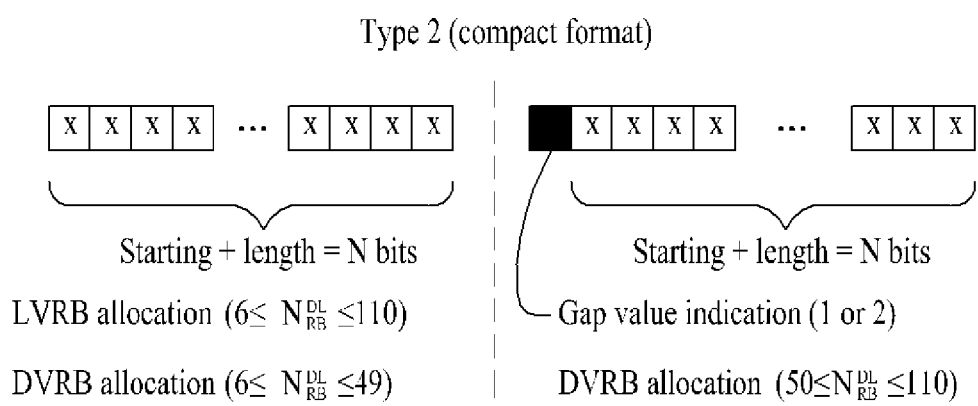
FIG. 9 illustrates control information formats for Type 2 RA and an example of resource allocation thereof.
Figure 10:
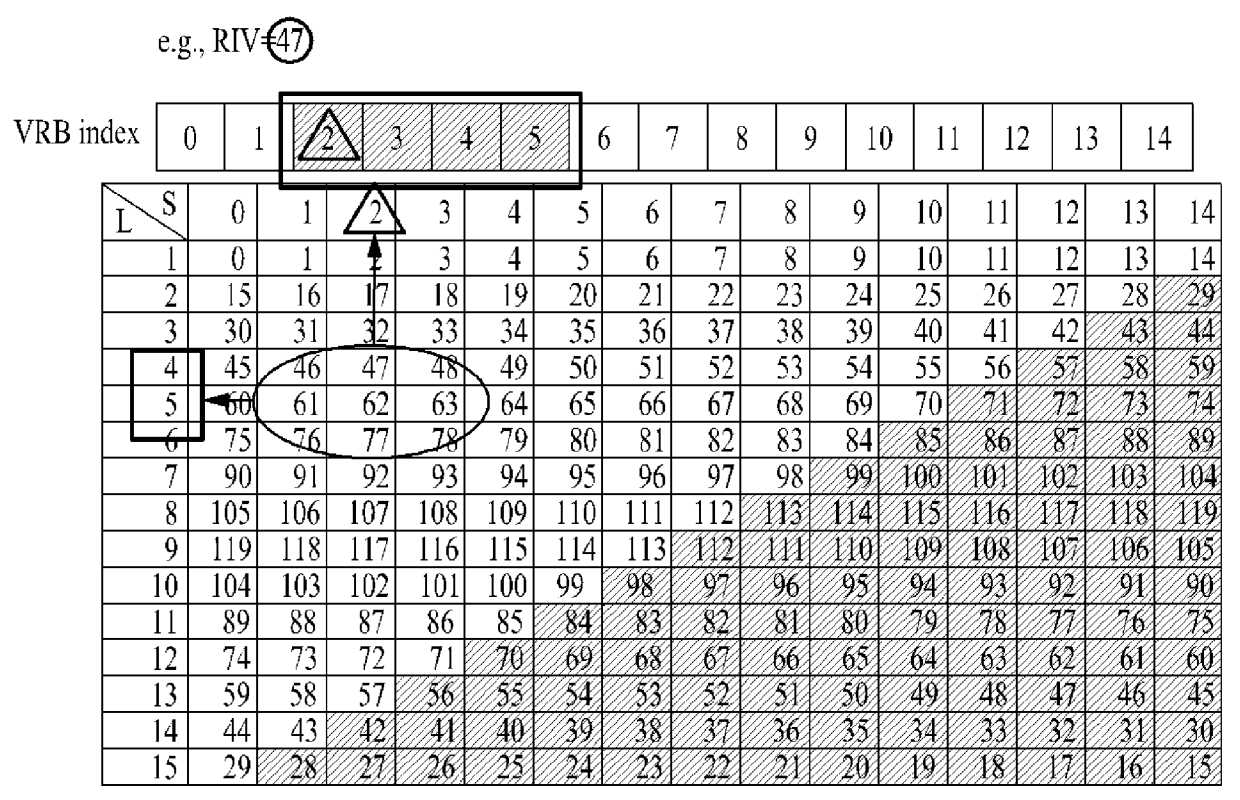

Hereinafter, resource allocation defined in legacy LTE will be described referring to FIG. 7 to FIG. 10. FIG. 7, FIG. 8 and FIG. 9 illustrate control information formats for Type 0 resource allocation (RA), Type 1 RA, and Type 2 RA and examples of resource allocation thereof, respectively. FIG. 10 illustrates a table used for start position and length determination in Type 2 RA.

A UE interprets a resource allocation field based on a detected PDCCH DCI format. The resource allocation field in each PDCCH includes two parts: a resource allocation header field and actual RB assignment information. PDCCH DCI formats 1, 2, and 2A for Type 0 and Type 1 RA have the same format and are distinguished by a single-bit resource allocation header field which is present according to DL system bandwidth. Specifically, Type 0 RA is indicated by 0 and Type 1 RA is indicated by 1. While PDCCH DCI formats 1, 2, and 2A are used for Type 0 or Type 1 RA, PDCCH formats 1A, 1B, 1C, and 1D are used for Type 2 RA. A PDCCH DCI format having Type 2 RA does not include a resource allocation header field. The resource allocation field indicates a PRB set of the first slot. Since slot hopping does not exist between the first slot and the second slot in the case of RA Type 0, Type 1, and Type 2-LVRB, which will be described later, the same PRB set as in the first slot is allocated in the second slot (i.e. PRB index (of the first slot)=PRB index (of the second slot)). Meanwhile, in the case of RA Type 2-DVRB, if the PRB set of the first slot is given, the PRB set of the second slot is determined by a slot hopping rule.

Referring to FIG. 7, in Type 0 RA, RB assignment information includes a bitmap indicating an RBG allocated to a UE. The RBG is a set of consecutive PRBs. The size of the RBG, P, depends upon system bandwidth as shown in Table 8.

TABLE 8

| System Bandwidth $N^{DL}_{RB}$ | RBG Size (P) |
|---|---|
| ≤10 | 1 |
| 11-26 | 2 |
| 27-63 | 3 |
| 64-110 | 4 |

In DL system bandwidth having $N^{DL}_{RB}$ as PRBs, a total number of RBGs, $N_{RBG}$, is given by $N_{RBG}=\text{ceil}(N^{DL}_{RB}/P)$, the size of floor($N^{DL}_{RB}/P$) RBGs is P, and the size of one RBG is $N^{DL}_{RB}-P\cdot\text{floor}(N^{DL}_{RB}/P)$ when $N^{DL}_{RR}$ mod P>0. Here, mod indicates a modulo operation. The size of a bitmap is $N_{RBG}$ and each bit corresponds to one RBG. All RBGs are indexed 0 to $N_{RBG}-1$ in a frequency increase direction and RBG 0 to RBG $N_{RBG}$ N-1 are mapped from a most significant bit (MSB) to a least significant bit (LSB) of the bitmap.

Referring to FIG. 8, in Type 1 RA, RB assignment information having the size of $N_{RBG}$ informs a scheduled UE of resources in an RBG subset in PRB units. An RBG subset p (0≤p<P) consists of every P-th RBG starting from an RBG p. The RB assignment information includes three fields. The first field has ceil{$\log_2(P)$} bits and indicates an RBG subset selected from among P RBG subsets. The second field has one bit and indicates shift of a resource assignment span within a subset. The shift is triggered when a bit value is 1 and is not triggered when a bit value is not 1. The third field includes a bitmap and each bit indicates one PRB within a selected RBG set. The size of a bitmap part used to indicate a PRB within the selected RBG subset is $N^{TYPE1}_{RB}$ and is defined as follows.

$$N_{RB}^{TYPE1}=\lceil N_{RB}^{DL}/P\rceil-\lceil\log_2(P)\rceil-1 \quad\quad \text{Equation 2}$$

An addressable PRB number in a selected RBG subset may start from an offset $\Delta_{shift}(p)$ from the smallest PRB number within the selected RBG subset and may be mapped to the MSB of a bitmap. The offset is expressed by the number of PRBs and is applied within the selected RBG subset. When the bit value within the second field for shift of the resource assignment span is set to 0, an offset for an RBG subset p is given as $\Delta_{shift}(p)=0$. In the other cases, the offset for the RBG subset p is given as $\Delta_{shift}(p)=N^{RBGsubset}_{RB}(p)-N^{TYPE1}_{RB}$. $N^{RBGsubset}_{RB}(p)$ denotes the number of PRBs within the RBG subset p and may be obtained as follows.

$$N_{RB}^{RBGsubset}(p) = \quad\quad \text{Equation 3}$$

$$\begin{cases} \left\lfloor\frac{N_{RB}^{DL}-1}{P^2}\right\rfloor\cdot P+P, & p<\left\lfloor\frac{N_{RB}^{DL}-1}{P}\right\rfloor\bmod P \\ \left\lfloor\frac{N_{RB}^{DL}-1}{P^2}\right\rfloor\cdot P+ \\ (N_{RB}^{DL}-1)\bmod P+1, & p=\left\lfloor\frac{N_{RB}^{DL}-1}{P}\right\rfloor\bmod P \\ \left\lfloor\frac{N_{RB}^{DL}-1}{P^2}\right\rfloor\cdot P, & p>\left\lfloor\frac{N_{RB}^{DL}-1}{P}\right\rfloor\bmod P \end{cases}$$

Referring to FIG. 9, in Type 2 RA, RB assignment information indicates a set of LVRBs or DVRBs consecutively allocated to a scheduled UE. If resource assignment is signaled in PDCCH DCI format 1A, 1B, or 1D, a 1-bit flag indicates whether an LVRB or DVRB is allocated (e.g. 0 denotes LVRB assignment and 1 denotes DVRB assignment). In contrast, if resource assignment is signaled in PDCCH DCI format 1C, only a DVRB is always allocated. A Type 2 RA field includes a resource indication value (RIV) and the RIV corresponds to a start RB $RB_{start}$ and length. The length denotes the number of virtually and consecutively allocated RBs.

For example, referring to FIG. 10, RIV=47 means that a total of four RBs are allocated starting from an RB of which VRB index is 2.

Figure 11:
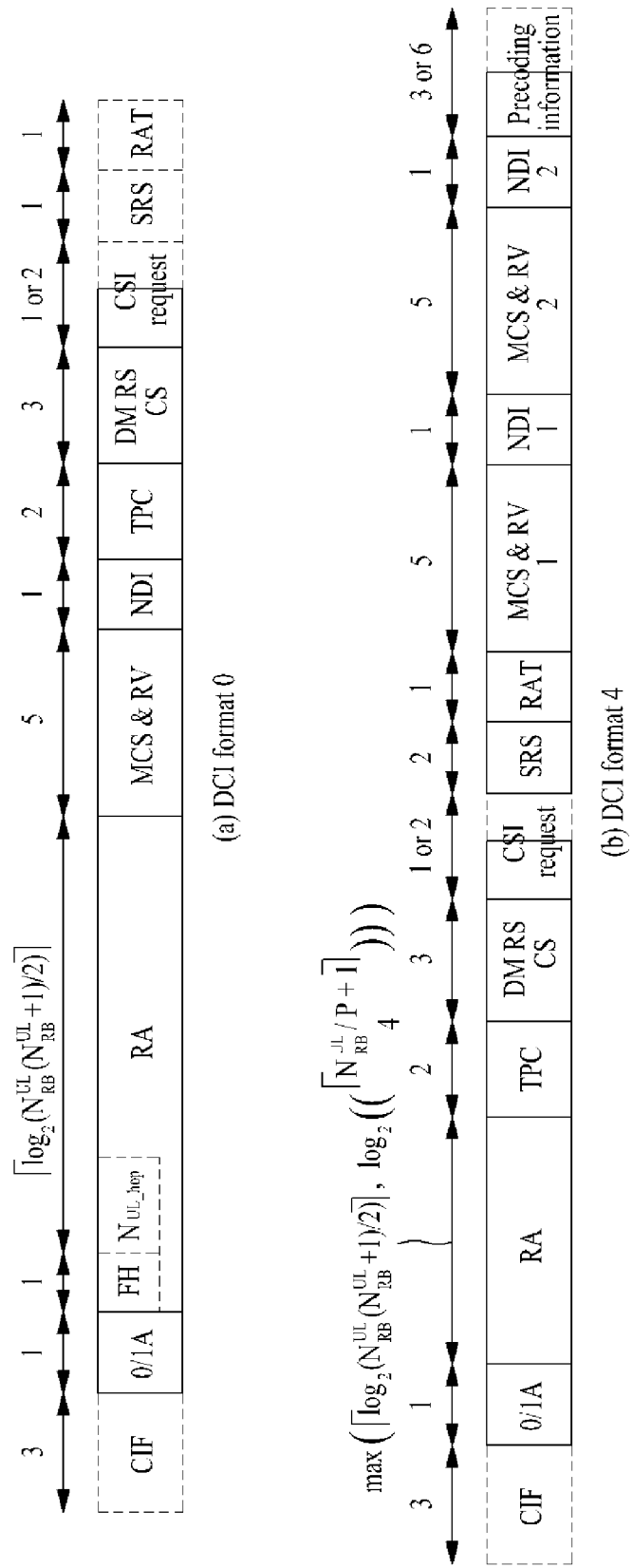
FIGS. 11 and 12 illustrate downlink control information (DCI) formats.
Figure 12:
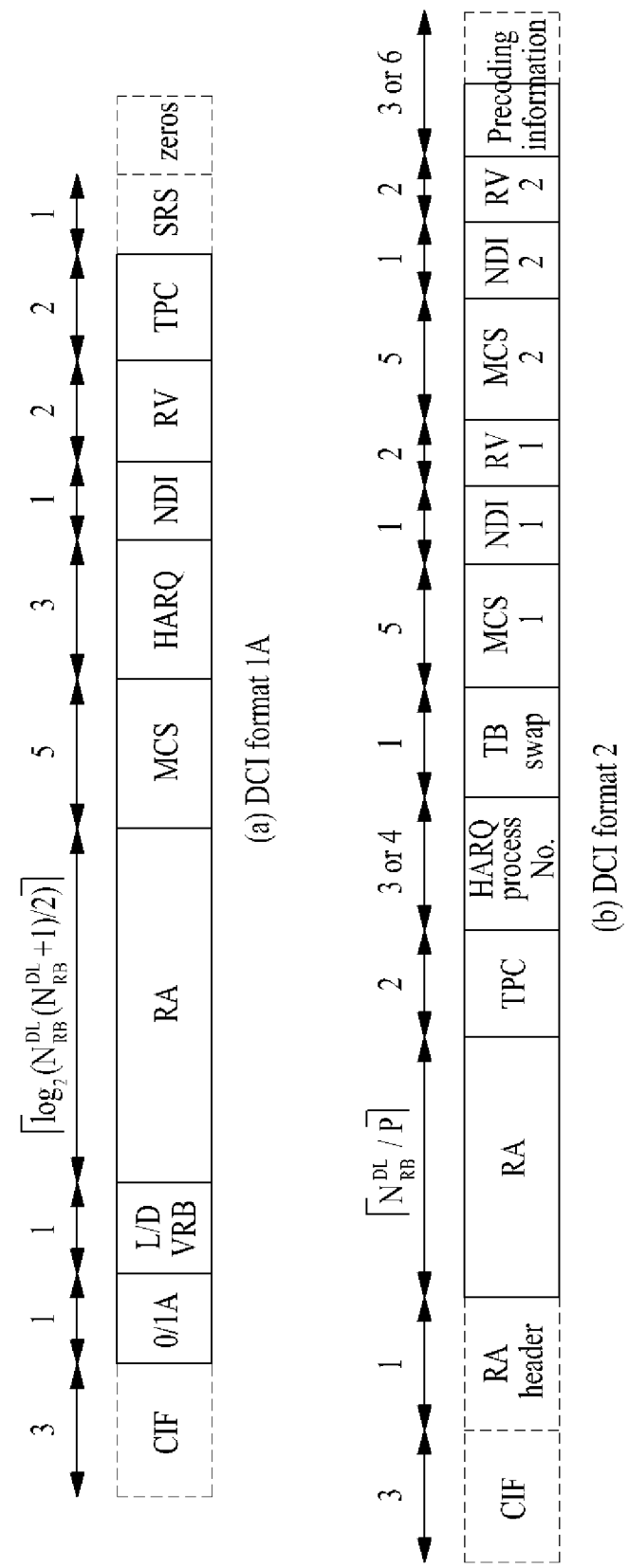

FIG. 11 and FIG. 12 illustrate downlink control information (DCI) formats. Specifically, FIG. 11 illustrates the structures of DCI format 0 and DCI format 4, used for UL scheduling, among DCI formats. FIG. 12 illustrates the structure of DCI format 1A for compact scheduling of one PDSCH codeword in one cell and the structure of DCI format 2 for resource allocation for a PDSCH for a closed-loop MIMO mode, among DCI formats. For reference, a cell refers to a combination of DL resources and UL resources rather than a geographic region. That is, a cell refers to a combination of resources operating on a DL carrier frequency and resources operating on a UL carrier frequency.

For reference, in FIGS. 11 and 12 and the subsequent figures, a number denoted in the upper side of each field represents the length of the field. In addition, fields indicated by short dotted lines represent fields which are present under a specific condition and which do not include associated bits if the condition is not satisfied.

DCI format 0 is used for scheduling of a PUSCH in one UL cell. A UL cell refers to resources operating on a UL carrier frequency. Referring to FIG. 11(a), information shown below may be transmitted by DCI format 0.

TABLE 9

| Field | Number of bits |
|---|---|
| Carrier indicator (CIF) | 1 or 3 |
| Flag for format 0/format 1A differentiation (0/1A) | 1 |
| Frequency hopping flag (FH) | 1 |
| Hopping resource allocation ($N_{UL\_hop}$) | $N_{UL\_hop}$ |
| Resource block assignment (RA) | $(\lceil\log_2(N_{RB}^{UL}(N_{RB}^{UL}+1)/2)\rceil - N_{UL\_hop})$ |
| Modulation and coding scheme and redundancy version (MCS & RV) | 5 |
| New data indicator (NDI) | 1 |
| TPC command for scheduled PUSCH (TPC) | 2 |
| Cyclic shift for DM RS and OCC index (DM RS CS) | 3 |
| CSI request (CSI request) | 1 or 2 |
| SRS request (SRS) | 0 or 1 |
| Resource allocation type (RAT) | 0 or 1 |

DCI format 4 is used for PUSCH scheduling in one UL cell in a multi-antenna port transmission mode. Referring to FIG. 11(b), information shown below may be transmitted by DCI format 4.

TABLE 10

| Field | Number of bits |
|---|---|
| Carrier indicator (CIF) | 1 or 3 |
| Resource block assignment (RA) | $\max\left(\lceil\log_2(N_{RB}^{UL}(N_{RB}^{UL}+1)/2)\rceil, \left\lceil\log_2\left(\binom{\lceil N_{RB}^{UL}/P+1\rceil}{4}\right)\right\rceil\right)$ |
| TPC command for scheduled PUSCH (TPC) | 2 |
| Cyclic shift for DM RS and OCC index (DM RS CS) | 3 |
| CSI request (CSI request) | 1 or 2 |
| SRS request (SRS) | 2 |
| Resource allocation type (RAT) | 1 |
| Modulation and coding scheme and redundancy version for transport block 1 (MCS & RV 1) | 5 |
| New data indicator for transport block 1 (NDI1) | 1 |
| Modulation and coding scheme and redundancy version for transport block 2 (MCS & RV 2) | 5 |
| New data indicator for transport block 2 (NDI2) | 1 |
| Preceding information and number of layers (Precoding information) | 3 or 6 |

DCI format 1A is used for compact scheduling of one PDSCH in one cell and for a random access procedure initiated by a PDCCH order. Referring to FIG. 12(a), information shown below may be transmitted by DCI format 1A.

TABLE 11

| Field | Number of bits |
|---|---|
| Carrier indicator (CIF) | 1 or 3 |
| Flag for format 0/format 1A differentiation (0/1A) | 1 |
| Localized/Distributed VRB assignment flag | 1 |
| Resource block assignment (RA) | $\lceil\log_2(N_{RB}^{DL}(N_{RB}^{DL}+1)/2)\rceil$ |
| Modulation and coding scheme (MCS) | 5 |
| HARQ process number (HARQ) | 3 (FDD), 4 (TDD) |
| New data indicator (NDI) | 1 |
| Redundancy version (RV) | 2 |
| TPC command for scheduled PUSCH (TPC) | 2 |
| SRS request (SRS) | 0 or 1 |
| Zeros (zeros) | payload size of format 0 - payload size of format 1A |

DCI format 2 is used for resource allocation for a PDSCH for a closed-loop MIMO mode. Referring to FIG. 12(b), information shown below may be transmitted by DCI format 2.

TABLE 12

| Field | Number of bits |
|---|---|
| Carrier indicator (CIF) | 1 or 3 |
| Resource allocation header (RA header) | 1 |
| Resource block assignment (RA) | $\lceil N_{RB}^{DL}/P\rceil$ |
| TPC command for scheduled PUSCH (TPC) | 2 |
| HARQ process number (HARQ) | 3 (FDD), 4 (TDD) |
| Transport block to codeword swap flag (TB swap) | 1 |
| Modulation and coding scheme for transport block 1 (MCS1) | 5 |
| New data indicator for transport block 1 (NDI1) | 1 |

TABLE 12-continued

| Field | Number of bits |
|---|---|
| Redundancy version for transport block 1 (RV1) | 2 |
| Modulation and coding scheme for transport block 2 (MCS2) | 5 |
| New data indicator for transport block 2 (NDI2) | 1 |
| Redundancy version for transport block 2 (RV2) | 2 |
| Precoding information | 3 or 6 |

In principle, DCI needs to be configured according to a corresponding format and deletion of a field in a DCI format or reduction of the length of the field is not permitted unless a predefined condition known to both an eNB and a UE is satisfied. For reference, in a 3GPP LTE-A system, carrier aggregation technology in which a plurality of UL/DL frequency blocks is aggregated to use wider bandwidth for transmission/reception of a radio signal may be used. A CIF field in the DCI format has a length of 3 bits only if carrier aggregation is configured for a UE and, if not, the CIF field is not present in DCI transmitted to the UE. That is, since a UE for which carrier aggregation is not configured can be aware that the DCI transmitted thereto is configured without the CIF field, the UE may acquire the DCI by decoding a DL signal received on a PDCCH without the CIF field. As another example, since the UE is aware of UL bandwidth $N_{RB}^{UL}$ and DL bandwidth $N_{RB}^{DL}$ allocated thereto, the UE may be aware how many bits constitute an RA field in the DCI. As still another example, referring to Table 9, a CSI request field of 2 bits is applied for UEs configured by more than one DL cell and only when the DCI format is mapped to a UE-specific search space given by a C-RNTI. Accordingly, a UE configured by a single DL cell decodes the DCI under the assumption that a CSI request field is one bit and the UE does not need to perform, in a common search space, DCI decoding assuming that the CSI request field is 2 bits. That is, if a system of a UE is configured according to specific system configuration, the DCI is configured such that fields of a given DCI format are present with predefined lengths at predefined locations unless the system of the UE is reconfigured. The eNB configures the DCI according to a determined DCI format and transmits the DCI to the UE and the UE attempts to decode the DCI according to the determined DCI format.

However, in order to solve a problem of deterioration in DCI reception performance of a UE when strength of a channel formed between the eNB and the UE is lowered to a specific value or less, the present invention proposes that the amount of information in some fields (e.g. a CIF field, an RA field, an MCS & RV field, an NDI field, etc.) of a DCI format be reduced, and bit(s) secured according to reduction of the amount of the information be deleted or set to a predetermined value or as many redundancy bits as the secured bit(s) be inserted. If the amount of information of some fields of the DCI format is reduced and thus secured bits are set to a predetermined value, since DCI is not substantially affected even when an error occurs in the secured bits, reliability and coverage of DCI transmission can increase. If the amount of information of some fields of the DCI format is reduced and thus an error detection/correction code such as CRC is inserted into the secured bits, since the length of the error detection/correction code increases, the reliability and coverage of the DCI can increase.

As a result of analyzing channel strength performed by a UE of the present invention, if the channel strength is lowered to a predetermined value or less, the UE may request, through a specific signal, an eNB to change or modify the DCI format. Alternatively, when the eNB analyzes channel state information (CSI) reported from the UE, if the channel strength is lowered to a predetermined value or less, the eNB itself may determine change or modification of the DCI format. If the eNB determines that the DCI format should be changed/modified at the request of a UE or by judgment thereof, the eNB may inform the UE that the DCI will be transmitted with the changed/modified DCI format, through a higher layer signal such as a radio resource control (RRC) signal. Alternatively, the UE may implicitly recognize that the DCI format is modified, by predetermined scheduling between the eNB and the UE.

That is, according to the present invention, instead of changing system configuration of a UE to another system configuration or changing transmission mode of an eNB to another transmission mode, the amount of information of DCI streams is reduced and redundancy of the DCI streams increases while a DCI format is maintained, thereby raising the reliability of DCI. In more detail, the present invention raises the reliability of the DCI by modifying the length of a field actually carrying information in a DCI format such that the length of the field is shorter than a predefined length. The present invention has an effect of raising the reliability of the DCI even without a system reconfiguration procedure, thereby improving coverage of a PDCCH for a UE which is located at a cell edge or has a poor channel state. Hereinafter, embodiments of the present invention capable of reducing the length of at least one of fields in a DCI format while maintaining the format will be described in detail.

Figure 13:
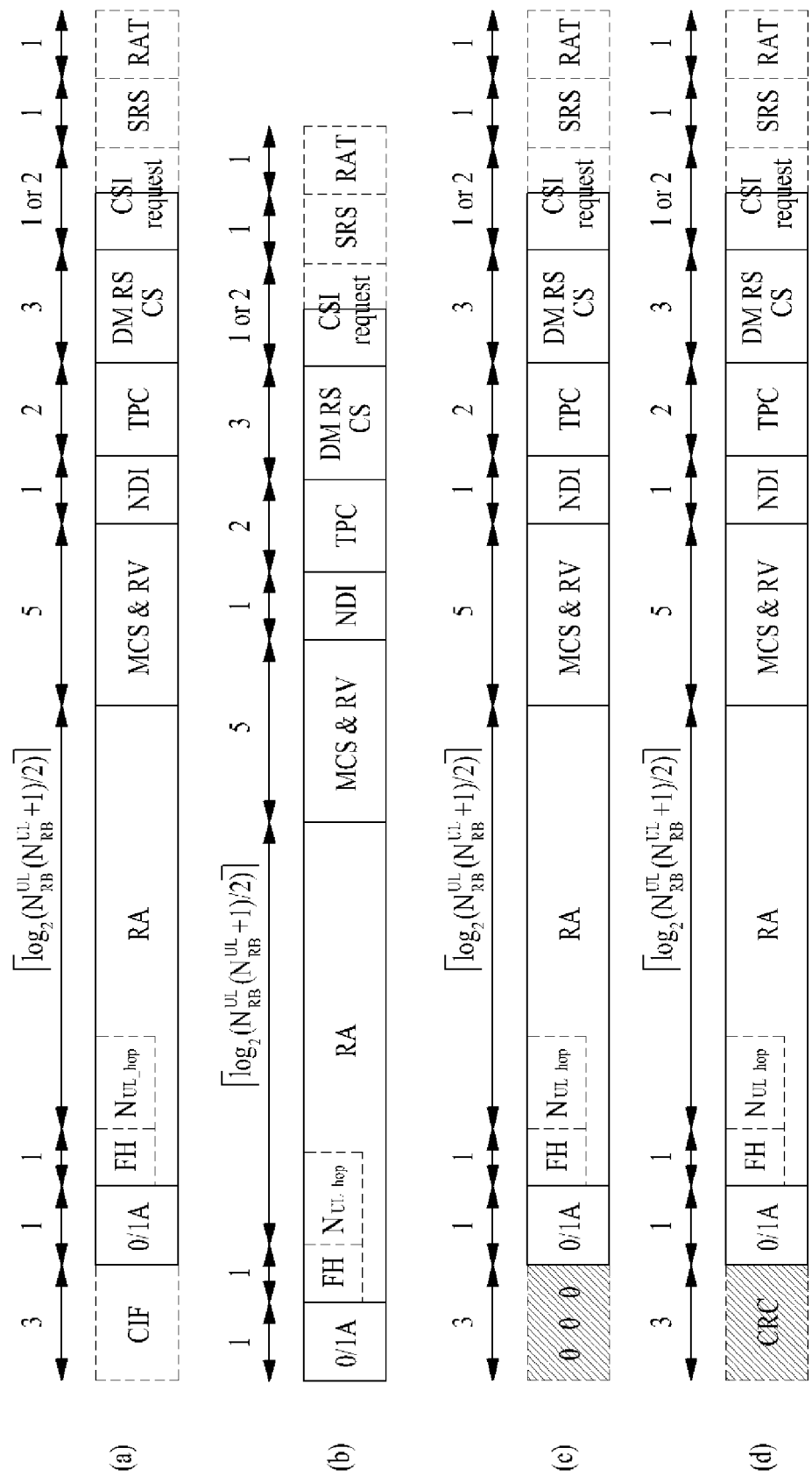
FIG. 13 is a diagram for explaining a first embodiment according to the present invention.

FIG. 13 is a diagram for explaining a first embodiment according to the present invention.

According to current standard, it is not necessary to configure a CIF field in DCI if carrier aggregation is not configured for a UE. However, new standard may be defined such that bits corresponding to the CIF field may be used to indicate other information even if carrier aggregation is not configured for the UE, unlike the current standard. Meanwhile, even when carrier aggregation is configured for the UE, an eNB may inform the UE that a (specific) CIF value is to be used as predetermined bits, through higher layer signaling or through a physical DL control/data channel and the eNB may not use the (specific) CIF value. Thus, although a DCI format is defined such that the CIF field may be present, if the CIF field is not actually used, the present invention deletes a 3-bit CIF field, sets the CIF field to a preset value, or inserts redundant bits such as CRC into the CIF field, in order to extend PDCCH coverage. In other words, according to a first embodiment of the present invention, the CIF field is not used to actually carry CIF information.

If a channel state between the eNB and the UE is normal, the eNB configures DCI for the UE according to normal DCI format 0 as illustrated in FIG. 13(a) and the UE decodes the DCI according to the normal DCI format. In other words, if carrier aggregation is configured for the UE, the UE may interpret the first 3 bits of a restored DCI bit sequence as a CIF, the next one bit as a flag (0/1A) for distinguishing between format 0 and format 1A, and the next one bit as a resource allocation flag.

However, if a channel between the eNB and the UE is poor or if a CIF field is unnecessary, DCI may be configured such that bits corresponding to the CIF field are deleted as illustrated in FIG. 13(b), bits corresponding to the CIF field are set to a predetermined value as illustrated in FIG. 13(c), or CRC is inserted into bits corresponding to the CIF field as illustrated in FIG. 13(d), according to the present invention.

A method of deleting the CIF field as illustrated in FIG. 13(b) causes much change in a legacy DCI format. Meanwhile a method for setting the CIF field to a predetermined value as illustrated in FIG. 13(c) or inserting redundancy bits into the CIF field as illustrated in FIG. 13(d) have advantages in that the UE only needs to change a decoding method because the legacy DCI format is used. Since the UE is implicitly aware as to whether a DCI format is modified, through an RRC signal, the UE may not perform error processing with respect to the first 3 bits or may regard the first 3 bits as CRC, thereby normally decoding the DCI.

While the first embodiment of the present invention has been described by exemplifying DCI format 0, the first embodiment may be applied to all DCI formats in which the CIF field is defined. For example, since current DCI formats are defined such that all DCI formats except for DCI formats 1C, 3, and 3A carry a CIF, the first embodiment may be applied even to DCI formats 1, 1A, 1B, 1C, 1D, 2, 2A, 2B, 2C, 3, 3A, and 4.

Figure 14:
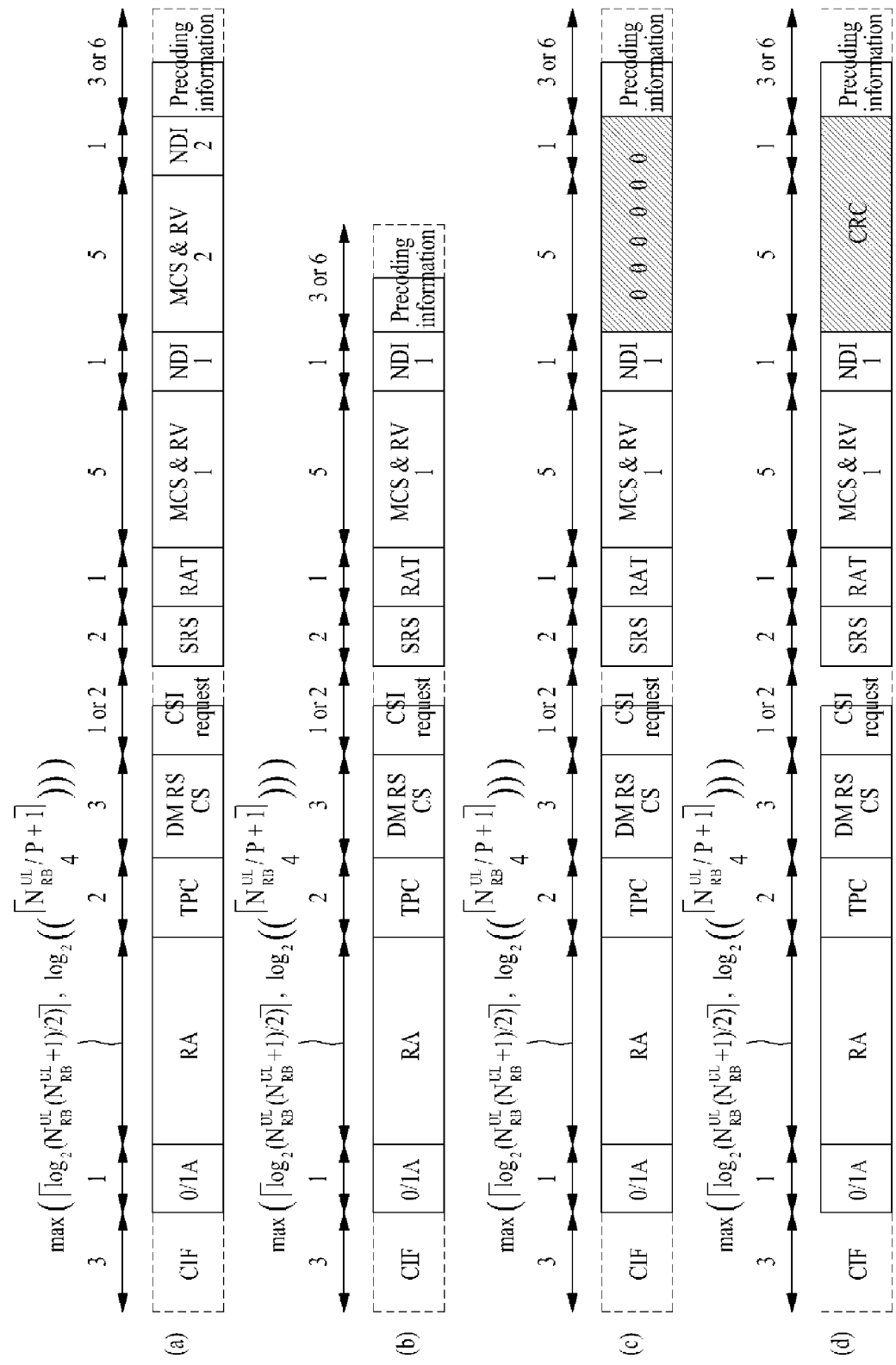
FIG. 14 is a diagram for explaining a second embodiment according to the present invention.

FIG. 14 is a diagram for explaining a second embodiment according to the present invention.

Among DCI formats, there are DCI formats defined to carry an MCS, RV, and NDI for each of a plurality of codewords. For example, in DCI formats 2, 2A, 2B, 2C, and 4, an MCS, RV, and NDI for transport block (TB) 1 and an MCS, RV, and NDI for TB 2 are defined. TB 1 and TB 2 correspond to codeword 0 and codeword 1 one to one.

In the second embodiment of the present invention, only MCS, RV, and/or NDI fields for one of two codewords are used in a specific condition (e.g. a poor channel state, determination of the eNB, etc.) and MCS, RV, and/or NDI fields for the other codeword are deleted or set to a predetermined value (e.g. all corresponding bits are set to 0), or CRC or an error detection/correction code corresponding to CRC is inserted into the MCS, RV, and/or NDI fields for the other codeword. In other words, in the second embodiment of the present invention, the MCS, RV, and/or NDI field for some codewords are not used to actually carry the MCS, RV, and/or NDI information.

For example, DCI format 4 is used for UL MIMO scheduling and includes two MCS & RV fields and two NDI fields as illustrated in FIG. 14(a). In the second embodiment of the present invention, valid information is set only in one of the two MCS and RV fields and in one of the two NDI fields, and bits corresponding to the other fields are deleted as illustrated in FIG. 14(b) or set to a predetermined value as illustrated in FIG. 14(c) or an error detection/correction code is inserted as illustrated in FIG. 14(c). The error detection/correction code is for a whole DCI stream.

Meanwhile, a demodulation reference signal (DM RS) is differently generated according to a rank. For example, an RS for demodulating a UL signal carried on a PUSCH (hereinafter, a PUSCH DM RS) is transmitted in each layer. A PUSCH DM RS sequence $r^{(p)}_{PUSCH}(\cdot)$ associated with a layer $\lambda \in \{0, 1, \ldots, \upsilon-1\}$ is given by the following equation.

$$r_{PUSCH}^{(\lambda)}(m \cdot M_{sc}^{RS}+n) = w^{(\lambda)}(m) r_{u,v}^{(\alpha\_\lambda)}(n) \quad \text{[Equation 4]}$$

In Equation 4, m=0,1, n=0, . . . , $M^{RS}_{sc}-1$, $M^{RS}_{sc}=M^{RS}_{sc}=M^{PUSCH}_{sc}$. $M^{PUSCH}_{sc}$ is scheduled bandwidth for UL transmission, expressed as a number of subcarriers.

The cyclic shift (CS), $\alpha\_\lambda$, in slot $n_s$ is given by the following equation.

$$\alpha\_\lambda = 2\pi n_{cs,\lambda}/12$$

$$n_{cs,\lambda} = ((n_{DMRS}^{(1)} + n_{DMRS,\lambda}^{(2)} + n_{PN}(n_s)) \bmod 12 \quad \text{[Equation 5]}$$

In Equation 5, $n^{(1)}_{DMRS}$ may be given according to a cyclic shift (cyclicShift) parameter configured by higher-layer signaling. In Equation 4, the orthogonal sequence $w^{(\lambda)}(m)$, and $n^{(2)}_{DMRS,\lambda}$ can be given by the following Table 13 using the cyclic shift field (e.g. DM RS CS field in FIG. 14) in the most recent uplink-related DCI for the transport block associated with the corresponding PUSCH transmission. Table 13 illustrates mapping of a cyclic shift field in a UL-related DCI format to $n^{(2)}_{DMRS,\lambda}$ and $[w^{(\lambda)}(0)w^{(\lambda)}(1)]$.

scheme after performing precoding, MIMO gain can be obtained according to the second embodiment of the present invention, unlike the case in DCI format 0. Accordingly, when DCI format 4 modified in accordance with the second embodiment of the present invention is used, coverage of PUSCH transmission is improved as compared with that in DCI format 0.

The same principle is applicable even to DL. For example, if the second embodiment of the present invention is applied to DCI format 2 for CRS based MIMO scheduling, DCI format 2 is identical to DCI format 1A used for rank 1 PSCH scheduling in that transmission rank is limited to 1 but, if DCI configured with a DCI format modified in accordance with the second embodiment of the present invention is transmitted to the UE, coverage of PDSCH transmission can be improved as compared with rank 1 PDSCH scheduling using DCI format 1A because the eNB may perform PDSCH beamforming using a precoding indication field (a precoding information field of FIG. 14).

Figure 15:
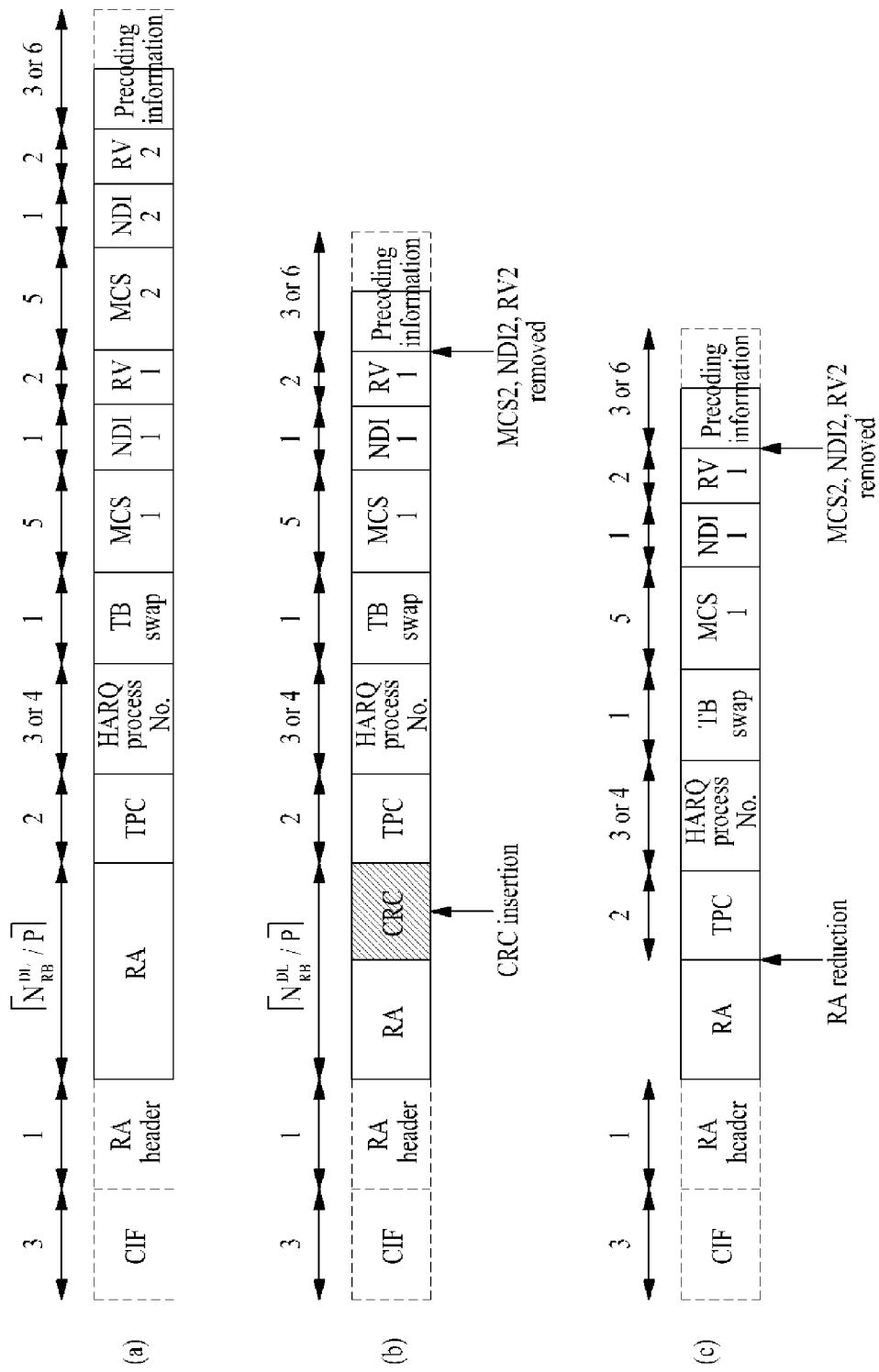
Figure 17:
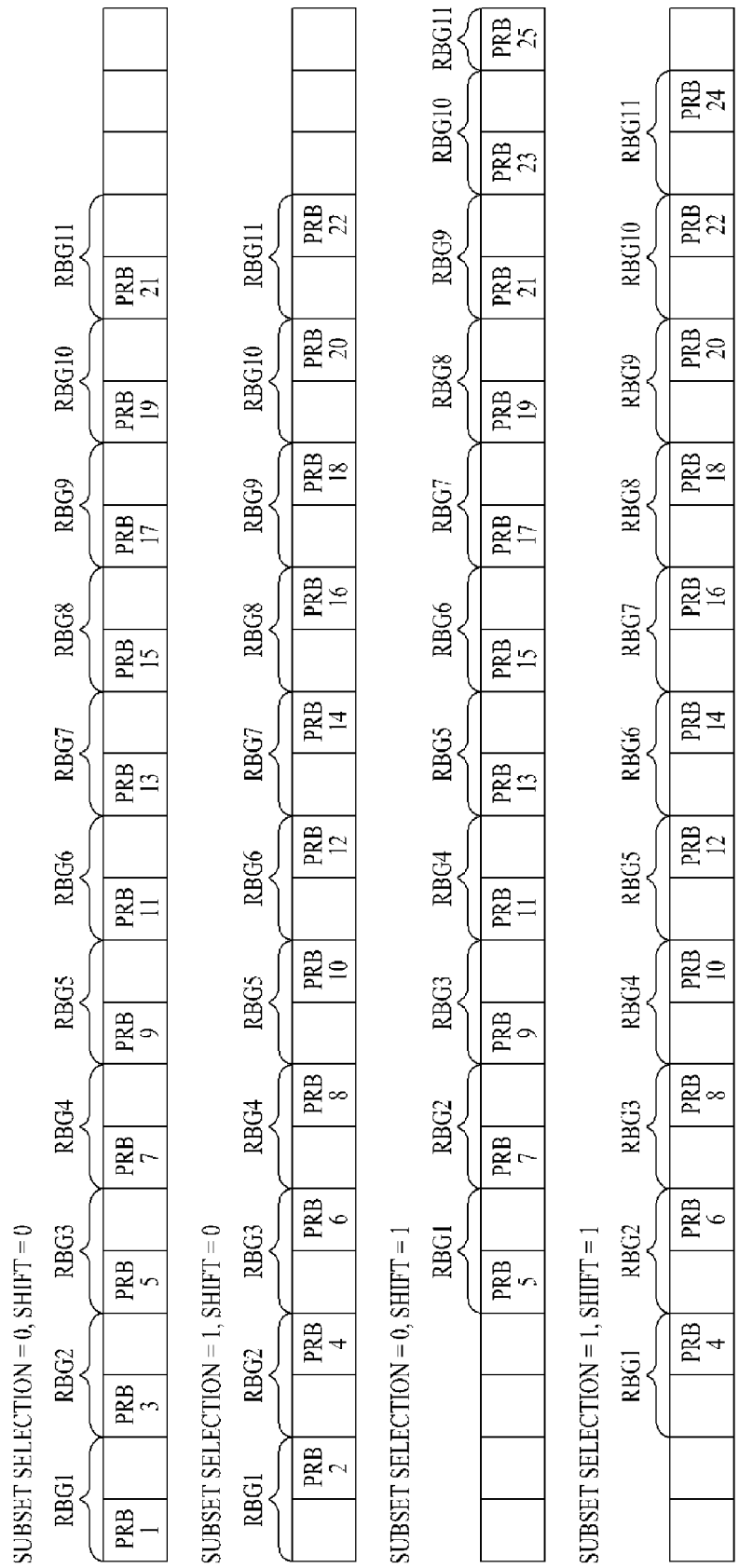

FIGS. 15 to 17 are diagrams for explaining a third embodiment according to the present invention.

In the third embodiment of the present invention, an RA field is reduced to less than a predetermined length, and secured bits obtained by reducing the length of the RA field are deleted or set to a predefined value or an error detection/correction code is inserted into the secured bits.

Referring to FIG. 15(a) illustrating normal fields of DCI format 2, an RA field of DCI format 2 is defined to include ceil($N^{DL}_{RB}$/P) bits. If a resource allocated to a UE can be expressed by bits fewer than the ceil($N^{DL}_{RB}$/P) bits, the other bits of the ceil($N^{DL}_{RB}$/P) bits may be configured as an error detection/correction code as illustrated in FIG. 15(b) or may be omitted as illustrated in FIG. 15(c). Alternatively, although not shown, the other bit(s) may be set to a predefined value. Among currently defined DCI formats, since DCI formats except for DCI formats 3 and 3A used for transmission of a TPC command include an RA field, the

TABLE 13

| Cyclic Shift Field in uplink-related DCI | $n^{(2)}_{DMRS,\lambda}$ | | | | $[w^{(\lambda)}(0)\ w^{(\lambda)}(1)]$ | | | |
|---|---|---|---|---|---|---|---|---|
| format | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

If DCI according to DCI format 4 is configured to have an MCS, RV, and NDI which are valid only with respect to one codeword, it is desirable in terms of reliability of the DCI that CS be configured only among values corresponding to rank 1 in a DM RS CS field.

For reference, DCI format 0 is a DCI format defined to carry scheduling information for one codeword. Transmission of DCI format 0 may be considered instead of modifying DCI format 4. However, if an eNB transmits DCI configured with DCI format 4 modified in accordance with the second embodiment of the present invention to a UE having a poor channel state, since the UE sets a rank of UL MIMO to 1 and transmits one codeword by a beamforming present invention may be applied to almost all DCI formats in accordance with the third embodiment of the present invention.

Hereinafter, an embodiment of the present invention in which resource allocation can be performed using bits of a length shorter than a predesignated length of an RA field will be described with reference to FIGS. 16 and 17.

A legacy RA field allocates resources for PDSCH transmission or PUSCH transmission based on entire bandwidth using a resource allocation scheme according to Type 0 RA, Type 1 RA, or Type 2 RA. According to the present invention, UL or DL frequency bandwidth allocated to a UE is partitioned into groups each group including more resources than resources in a legacy RA scheme. For example, referring to FIG. 16, an eNB may partition bandwidth of the UE into RB groups each having 10 RBs in order of frequency. Although FIG. 16 shows that successive RBs are grouped, distributed RBs may be bound into one group. If Type 0 RA illustrated in FIG. 7 and Type 1 RA illustrated in FIG. 8 are used, the number of bits necessary for RA is reduced to ¼ of the predefined number of bits and, if Type 2 RA illustrated in FIG. 9 is used, the number of bits necessary for RA is reduced by 4 bits.

Meanwhile, the length of the RA field may be reduced by differently configuring an RBG or a subset from an RBG or a subset used in the legacy RA scheme. Hereinafter, the legacy scheme and the present invention for each of Type 0 RA, Type 1 RA, and Type 2 RA will be compared under the assumption that the number of RBs of the entire UL or DL bandwidth allocated to a UE is 25.

Referring to Table 8, in legacy Type 0 RA, if bandwidth includes 25 RBs, RBs are grouped in units of two RBs. Accordingly, 25 RBs are partitioned into RBG#1={RB#1, 2}, . . . , RBG#13={RB#25}. In this case, in Type 0 RA, since each RBG is indicated as a bitmap, at least 13 bits are needed for an RA field. In the present invention, RBs in the entire bandwidth are grouped into more than two (e.g. four) RBs. In this case, 25 RBs may be partitioned into RBG#1={RB#1, 2, 3, 4}, . . . , RBG#6={RB#21, 22, 23, 24}, RBG#7={RB#25} and 7 bits are needed for the RA field.

Referring to FIG. 17, in legacy Type 1 RA, RBs are divided into subset 0={odd-numbered RBs} and subset 1={even-numbered RBs}. An eNB determines from which RB a specific length of RBs is to be selected through a shift bit in a corresponding subset and informs a UE of RBs actually allocated to the UE, through a bitmap. Therefore, if bandwidth includes 25 RBs, a total of 13 bits including one bit for subset selection, one bit for shift indication, and 11 bits for a RB bitmap according to Equation 2 is needed. According to the present invention, two or more subsets are configured so that the length of the RA field can be reduced. For example, 25 RBs are divided into subset 0={(4k+1)-th RB}, subset 1={(4k+2)-th RB}, subset 2, and subset 3 and the eNB may determine from which RBs a specific length of RBs is to be selected in a subset selected from among four subsets. In this case, the RA field may be configured by 7 bits of two bits for subset selection+one bit for shift+four bits for an RB bitmap.

In type 2 RA, when a UE receives a specific RIV, a start position and length are determined using a predesignated table as illustrated in FIG. 10 for example. In the present invention, the start position and length may be restricted to a specific value, for example, an even number or an odd number. In this case, referring to FIG. 10, since each of the number of rows and the number of columns is reduced by half, up to two bits (one bit for indicating a start position and one bit for indicating length) out of the original number of bits of the RIV can be reduced. As another example, if up to 40 RBs among RBs are included in the entire bandwidth, since a total of 40 columns is needed for a start position in legacy Type 2RA, ceil(log$_2$40) bits, i.e. 6 bits, are needed. However, as illustrated in FIG. 16, if 40 RBs are partitioned into four groups each having 10 RBs, since the start position may be restricted to a multiple of 10, only a group in which resource allocation is started among four groups needs to be indicated. Accordingly, since only four columns in the table of FIG. 10 are used, ceil(log$_2$40/4) bits, i.e. 2 bits, are needed. Accordingly, gain of four bits can be obtained compared with legacy Type 2 RA. The number of bits of the RIV may be reduced by adjusting granularity of length.

The length of the RA field may be reduced by various methods in addition to the above method. According to the third embodiment of the present invention, DCI may be configured by reducing bits corresponding to the number of reduced bits of the RA field, a predetermined value corresponding to the number of the recued bits is set, or CRC corresponding to the number of the reduced bits may be included.

The first, second, and third embodiments of the present invention may be applied together or separately. That is, DCI of the present invention may be configured according to a modified DCI format in accordance with at least one of the first, second, and third embodiments. Upon decoding a PDCCH, a UE performs blind decoding in a search space. A common search space (CSS) or a UE-specific search space (USS) in which blind decoding is to be performed is determined with respect to each DCI format. Even if a DCI format is modified according to at least one of the embodiments of the present invention, blind decoding may be performed in a search space according to the modified DCI format. In the present invention, it is assumed that the modified DCI format is mapped in a search space of the same position as a DCI format prior to modification. Simultaneously, since the UE implicitly or explicitly recognizes that a DCI format has been modified, the UE may perform blind decoding while expecting that a signal of the modified DCI format is transmitted to a CSS and a USS. Hence, additional decoding overhead does not occur even when a DCI format is modified according to the embodiments of the present invention.

Figure 18:
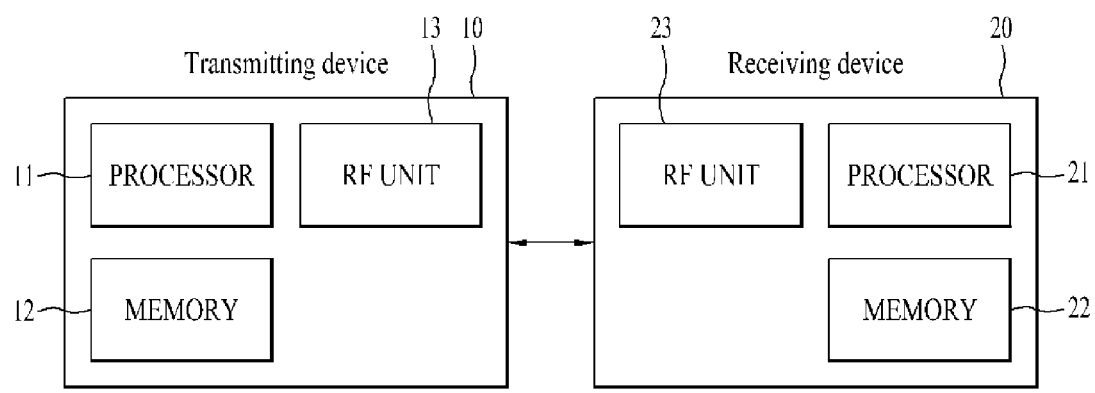
FIG. 18 is a block diagram illustrating elements of a transmitting device 10 and a receiving device 20 for implementing the present invention.

FIG. 18 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc.

performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether a channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

According to the embodiments of the present invention, the eNB processor generates DCI and controls the eNB RF unit to transmit the generated DCI on a PDCCH. The eNB processor may generate the DCI according to a modified DCI format in accordance with to at least one of the first and second embodiments of the present invention by modifying a legacy DCI format or some fields of the legacy DCI format. The eNB processor may control the eNB RF unit to transmit explicit or implicit information about modification of a DCI format to the UE. The eNB processor controls the eNB RF unit to perform PDSCH transmission or PUSCH reception according to the DCI. The UE processor detects DCI thereof by monitoring a PDCCH in a search space. The UE processor may monitor a PDCCH in the search space by attempting to decode the PDCCH according to the legacy DCI format. Upon receiving information explicitly indicating modification of the DCI format from the eNB or implicitly recognizing modification of the DCI format, the UE processor detects DCI thereof from a DL control signal by attempting to decode the PDCCH in the search space according to the modified DCI format rather than the legacy DCI format. The UE processor may control the UE RF unit to perform PDSCH reception or PUSCH transmission as indicated by a detected DCI format.

The modified DCI format is obtained by reducing the length of at least one of a plurality of fields of the legacy DCI format to shorter than a predefined length of the corresponding field. The length of at least one field of the legacy DCI format may be modified to be shorter than a predefined length according to at least one of the first to third embodiments of the present invention. The eNB processor may configure DCI excluding bits corresponding to the difference in length between a predefined field and a modified field or may configure the DCI by configuring an error detection or correction code (e.g. CRC). Upon explicitly or implicitly recognizing modification of a DCI format, the UE may be aware that the length of a partial field of DCI thereof is configured to be shorter than a predesignated length. Accordingly, the UE processor may decode the DCI from a DL signal under the assumption that bits corresponding to the difference between a predesignated length and a modified length of a field to which the first, second, or third embodiment of the present invention is applied are not present in the DCI, decode the DCI under the assumption that the corresponding bits are set to a predesignated value, or decode the DCI under the assumption that the corresponding bits are an error detection or correction code.

According to the present invention, reliability and coverage of control signal transmission can be increased.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a relay, a UE, or other devices in a wireless communication system.

The invention claimed is:

1. A method for receiving a downlink control signal by a user equipment, the method comprising:
   receiving, by the user equipment, modification information indicating modification of a downlink control information (DCI) format
   decoding, by the user equipment, the downlink control signal according to a modified DCI format of the DCI format according to the modification information; and
   performing, by the user equipment, downlink data reception or uplink data transmission indicated by the decoded downlink control signal,
   wherein the DCI format is configured with a plurality of information fields, each of which has a predefined length,
   wherein the modified DCI format is different from the DCI format in that a first length of at least one information field in the modified DCI format is a shorter than a second length of a corresponding information field in the DCI format, and
   wherein a predetermined value or an error correction code is set to bits corresponding to difference between the first length and the second length.

2. The method according to claim 1, wherein the at least one information field is at least a carrier indicator field (CIF), a resource assignment (RA) field, a modulation and coding scheme (MCS) field, a redundancy version (RV) field, or a new data indicator (NDI) field.

3. The method according to claim 1, wherein the at least one information field includes a resource assignment (RA) field, and a resource allocation unit assigned by a RA field (modified RA field) in the modified DCI format is larger than that assigned by a RA field (original RA field) in the specific DCI format.

4. A user equipment for receiving a downlink control signal, the user equipment comprising:
   a radio frequency (RF) unit; and
   a processor configured to:
   control the RF unit to receive modification information indicating modification of a downlink control information (DCI) format,
   decode the downlink control signal according to a modified DCI format of a DCI format according to the modification information, and
   control the RF unit to perform downlink data reception or uplink data transmission indicated by the decoded downlink control signal, wherein the DCI format is configured with a plurality of information fields, each of which has a predefined length,
   wherein the modified DCI format is different from the DCI format in that a first length of at least one information field in the modified DCI format is a shorter than a second length of a corresponding information field in the specific DCI format, and
   wherein a predetermined value or an error correction code is set to bits corresponding to difference between the first length and the second length.

5. The user equipment according to claim 4, wherein the at least one information field is at least one a carrier indicator field (CIF), a resource assignment (RA) field, a modulation and coding scheme (MCS) field, a redundancy version (RV) field, or a new data indicator (NDI) field.

6. The user equipment according to claim 4, wherein the at least one information field includes a resource assignment (RA) field, and a resource allocation unit assigned by a RA field (modified RA field) in the modified DCI format is larger than that assigned by a RA field (original RA field) in the specific DCI format.

7. A method for transmitting a downlink control signal by a base station, the method comprising:
   transmitting, by the base station, modification information indicating modification of a downlink control information (DCI) format;
   modifying the DCI format into a modified DCI format according to the modification information,
   transmitting, by the base station, the downlink control signal configured according to the modified DCI format instead of the DCI format; and
   performing, by the base station, downlink data transmission or uplink data reception indicated by the downlink control signal,
   wherein the DCI format is configured with a plurality of information fields, each of which has a predefined length,
   wherein the modified DCI format is different from the DCI format in that a first length of at least one information field in the modified DCI format is a shorter than a second length of a corresponding information field in the specific DCI format, and
   wherein a predetermined value or an error correction code is set to bits corresponding to difference between the first length and the second length.

8. The method according to claim 7, wherein the at least one information field is at least one a carrier indicator field (CIF), a resource assignment (RA) field, a modulation and coding scheme (MCS) field, a redundancy version (RV) field, or a new data indicator (NDI) field.

9. The method according to claim 7, wherein the at least one information field includes a resource assignment (RA) field, and a resource allocation unit assigned by a RA field (modified RA field) in the modified DCI format is larger than that assigned by a RA field (original RA field) in the specific DCI format.

10. A base station for transmitting a downlink control signal, the base station comprising:
    a radio frequency (RF) unit; and
    a processor configured to:
    control the RF unit to transmit modification information indicating modification of a downlink control information (DCI) format,
    modify the DCI format into a modified DCI format according to the modification information,
    control the RF unit to transmit the downlink control signal according to the modified DCI format instead of the DCI format, and
    control the RF unit to perform downlink data transmission or uplink data reception indicated by the transmitted downlink control signal,
    wherein the DCI format is configured with a plurality of information fields, each of which has a predefined length,
    wherein the modified DCI format is different from the DCI format in that a first length of at least one information field in the modified DCI format is a shorter than a second length of a corresponding information field in the specific DCI format, and
    wherein a predetermined value or an error correction code is set to bits corresponding to difference between the first length and the second length.

11. The base station according to claim 10, wherein the at least one information field is at least one of a carrier indicator field (CIF), a resource assignment (RA) field, a modulation and coding scheme (MCS) field, a redundancy version (RV) field, or a new data indicator (NDI) field.

12. The base station according to claim 10, wherein the at least one information field includes a resource assignment (RA) field, and a resource allocation unit assigned by a RA field (modified RA field) in the modified DCI format is larger than that assigned by a RA field (original RA field) in the specific DCI format.

* * * * *